United States Patent
Hsiao et al.

(10) Patent No.: US 6,496,944 B1
(45) Date of Patent: Dec. 17, 2002

(54) METHOD FOR DATABASE ASSISTED FILE SYSTEM RESTORE

(75) Inventors: Hui-I Hsiao, Saratoga, CA (US); Kiran Mehta, San Jose, CA (US); Inderpal Singh Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,368

(22) Filed: Oct. 6, 1999

(51) Int. Cl.$^7$ ................................................. G06F 11/00
(52) U.S. Cl. ........................................... 714/15; 714/20
(58) Field of Search .............................. 714/15, 18, 20, 714/21; 707/202, 204

(56) References Cited

U.S. PATENT DOCUMENTS

| | | | |
|---|---|---|---|
| 4,945,474 A | | 7/1990 | Elliott et al. ................. 364/200 |
| 5,504,883 A | * | 4/1996 | Coverston et al. .......... 395/600 |
| 5,566,297 A | * | 10/1996 | Devarakonda et al. . 395/182.13 |
| 5,577,220 A | | 11/1996 | Combs et al. ............... 395/416 |
| 5,727,206 A | * | 3/1998 | Fish et al. ................... 395/618 |
| 5,754,782 A | | 5/1998 | Masada ................. 395/200.43 |
| 5,754,848 A | | 5/1998 | Hanes .......................... 395/616 |
| 5,765,151 A | * | 6/1998 | Senator .......................... 707/8 |
| 5,774,717 A | * | 6/1998 | Porcaro ....................... 707/202 |
| 5,778,395 A | | 7/1998 | Whiting et al. ............. 707/204 |
| 5,793,944 A | | 8/1998 | Luick ..................... 395/182.13 |
| 5,794,252 A | | 8/1998 | Bailey et al. ................ 707/202 |
| 5,813,017 A | | 9/1998 | Morris ......................... 707/204 |
| 6,205,558 B1 | * | 3/2001 | Sobel ........................... 714/15 |

OTHER PUBLICATIONS

"Changed Data Only Backup and Recovery," IBM Technical Disclosure Bulletin, vol. 39, No. 03, Mar. 1996, pp. 367–369.

"Method to Ensure the Integrity of File Operations in a Database Transaction," IBM Technical Disclosure Bulletin, vol. 38, No. 07, Jul. 1995, pp. 475–477.

\* cited by examiner

*Primary Examiner*—Robert Beausoleil
*Assistant Examiner*—Marc M Duncan
(74) *Attorney, Agent, or Firm*—Lacasse & Associates, LLC; Randy W. Lacasse; Khanh Q. Tran, Esq.

(57) ABSTRACT

Recovery of a filesystem directory structure is performed to restore it to any point in time and also to synchronize a database restore and a filesystem restore to bring the two restores to a database consistent state. A database management system (DBMS) manages external files and hierarchical directory structures to enable recovery and reconciliation of the files and filesystems, under DBMS control, after filesystem crashes. First, a database table, which recorded previous directory creations and deletions, is used to rebuild a filesystem's directory structure to any previous database state and then external file link information is used to restore files to that same state.

22 Claims, 7 Drawing Sheets

| 102 FSID | 104 INODE | 106 Parent INODE | 108 Directory Name | 110 Status | 112 Time Stamp | 114 Rm Time | 116 Information |
|---|---|---|---|---|---|---|---|
| 14 | 0 | NULL | dlfs2 | Active | 800 | | root |
| 14 | 1 | 0 | Image | Active | 805 | | mount |
| 12 | 0 | NULL | dlfs1 | Active | 803 | | root |
| 12 | 1 | 0 | User | Delete | 801 | 802 | mount |
| 12 | 2 | 1 | Usr | Active | 806 | | mount |
| 12 | 2 | 1 | Datalinks | Delete | 820 | 810 | xxx |
| 14 | 2 | 1 | a_z | Active | 807 | | A to Z |
| 14 | 2 | 1 | a_m | Active | 833 | | A to M |
| 14 | 3 | 1 | n_z | Active | 850 | | N to Z |

FIG. 1

METHOD FOR DATABASE ASSISTED FILE SYSTEM RESTORE

BACKGROUND OF THE INVENTION

1. Field of Invention

The present invention relates generally to the field of computer information archiving and backup recovery. More specifically, the present invention is related to the control of a filesystem recovery process by a database management system. The method of this invention has particular application in restoring a filesystem and files to any point in time in the event of a filesystem crash.

2. Discussion of Prior Art

Data archiving and restoration have always been important to critical computer applications and data. The prior art in this area describes many different approaches to improving speed, reliability, efficiency, and storage requirements of archival solutions. Independently, database management systems (DBMS) have undergone their own development. Aside from the various models such as relational, hierarchical and object-oriented, database management systems have evolved to manage visual, binary and even distributed data. The application of DBMS principles to filesystem archival and recovery, however, has not been adequately addressed as indicated in the following discussion of related prior art.

The patent to Elliott et al. (4,945,474) provides for a database transaction logging method which allows operational recovery after an I/O error. The disclosed restoration is limited to a database rather than restoring the underlying filesystem.

The patent to Combs et al. (5,577,220) describes a mechanism for taking a snapshot of a CPU state and restoring to that state if needed. The system described can only be restored to the snapshotted state rather than any previous state.

The patent to Hanes (5,754,848) provides for a disaster recovery system which first restores a traditional filesystem (i.e 8.3 filenames) which has libraries to allow subsequent recovery using long filenames. The described method relates to translating between filenaming conventions rather than maintaining a recoverable history of filesystem operations.

The patent to Masada (5,754,782) provides for a document backup and restoration system in a GroupWare environment. However, no discussion of combining both a database restoration and a filesystem recovery is provided.

The patent to Whiting et al. (5,778,395) provides for a space reducing data archiving system which stores only file changes after an initial filesystem snapshot is stored, but fails to discuss synchronizing a particular version with an accompanying database state.

The patent to Luick (5,793,944) describes a hardware method of data storing and restoring upon the occurrence of a variety of errors and is limited to teaching a method of capturing various hardware states rather than capturing filesystem directory structure states.

The patent to Bailey et al. (5,794,252) provides for a database transaction logging system to assist with database duplication. The logging system discussed, however, fails to consider the maintenance of filesystem directory transactions.

The patent to Morris (5,813,017) provides for a distributed data backup system which reduces transmission bandwidth and storage requirements by archiving files as delta (i.e changed) files across a network. However, no teaching is provided which synchronizes a retrieved delta version with a desired database restoration state.

The IBM Technical Disclosure Bulletin entitled "Table Relocation Alternative For Restore" describes an interactive method of restoring backed-up data to a filesystem having a different structure than that of the filesystem from which it was originally archived; although, no provision for restoring the filesystem is discussed.

The IBM Technical Disclosure Bulletin entitled "Method to Ensure the Integrity of File Operations in a Database Transaction" teaches a COMMIT and ROLLBACK algorithm to ensure database transactions do not leave a filesystem in an inconsistent state. However, relating the consistent database to a previous directory structure is not taught.

The IBM Technical Disclosure Bulletin entitled "Changed Data Only Backup and Recovery" details a multi-version backup system which archives only changes to files which have previously been archived but fails to discuss how to restore files to an underlying filesystem directory structure which might also have changed.

Whatever the precise merits, features and advantages of the above cited references, none of them achieve or fulfill, individually or in combination, the purposes of the present invention. They fail to provide for a database managed table which logs filesystem directory operations and without such a log, the prior art fails to teach a method of restoring a filesystem directory structure to a previous known state. Furthermore, without a point-in-time directory recovery method, the above mentioned prior art fails to provide for a method of synchronizing a database restore to a filesystem directory structure restore and file restore.

SUMMARY OF THE INVENTION

A database management system (DBMS) is used to maintain a record of a filesystem's directory structure (registry database). The creation, removal or update of a directory results in a record, pertaining to that event, being stored into a database table of similar events. In addition, files are also linked to a DBMS (user database) and archived according to its management rules (i.e. DBMS references and/or controls the linked files). In the event of a filesystem crash, the DBMSs are used to restore the filesystem through the use of the directory structure database table which allows reconstruction of the filesystem to any previous filesystem state. Furthermore, files can then be recovered to match that state and thereby reconcile external files linked to a database to any previous state.

While described as two separate databases, implementing the registry database and the user database as a single database is also considered within the scope of the present invention. The registry database and the user database are logical entities and mapping them to the same physical database is functionally equivalent to mapping them to two different physical databases. One difference worth mentioning, however, is that the registry database is created by the system and is not normally visible to users, while the user database is created by the user. Throughout this specification, DBMS is used when generally referring to these databases regardless of their actual physical mapping.

BRIEF DESCRIPTION OF THE DRAWINGS

FIG. 1 illustrates the table structure of the present invention for storing directory operations information.

DESCRIPTION OF THE PREFERRED EMBODIMENTS

Figure 2:
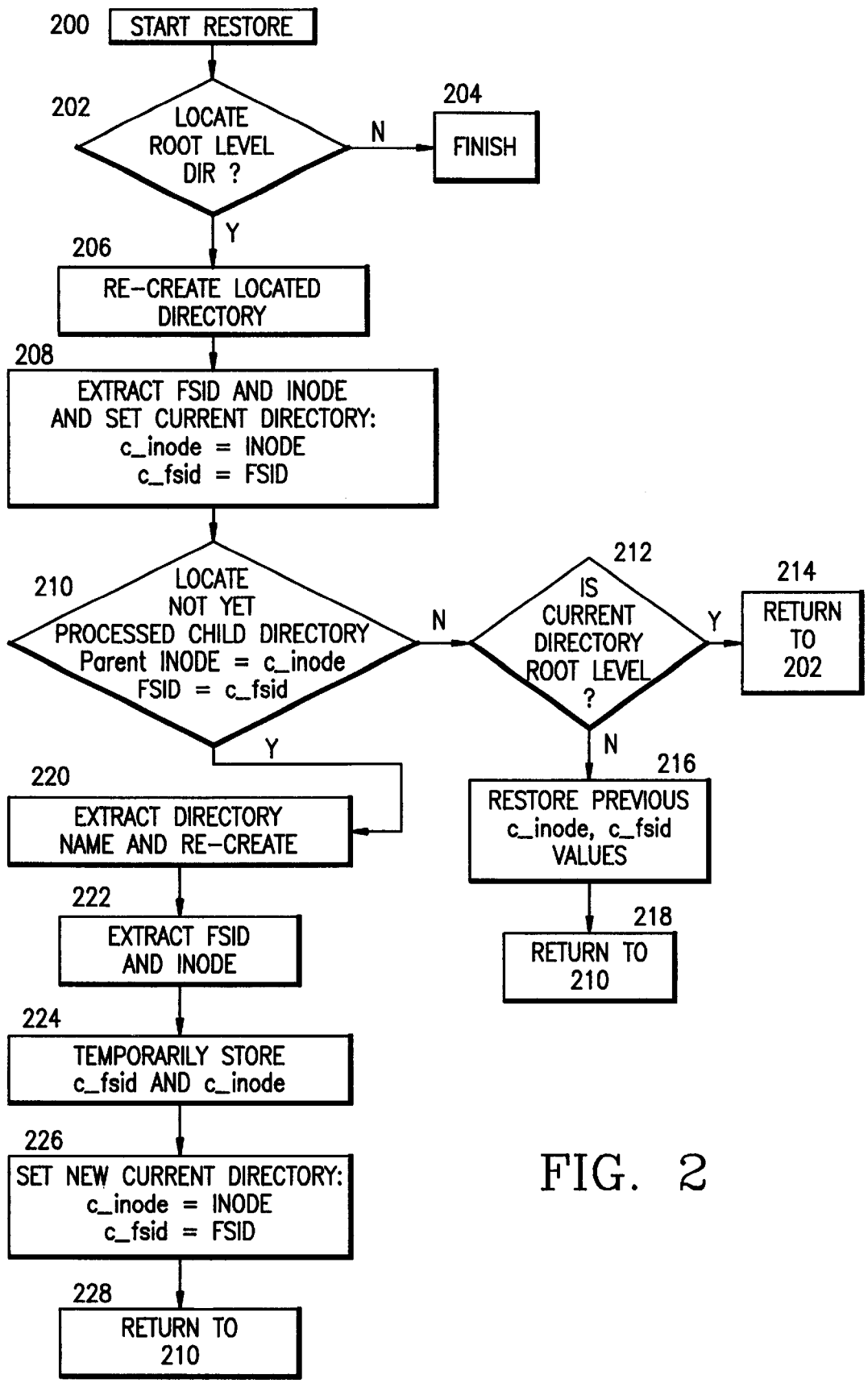
FIG. 2 illustrates a flowchart for the algorithm of the present invention which restores an entire filesystem's directory structure.
Figure 3A:
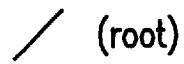
FIGS. 3a–3g collectively illustrate the progression of a filesystem's recovery during reconstruction performed according to the present invention.
Figure 3B:
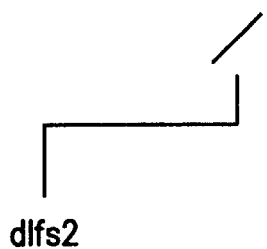
Figure 3C:
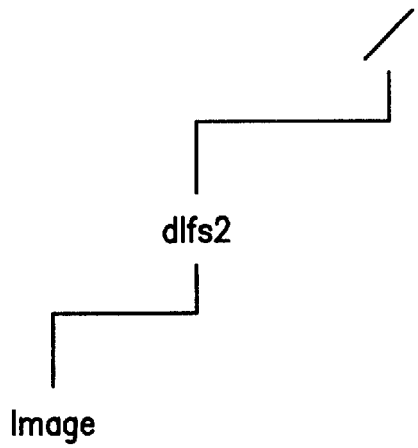
Figure 3D:
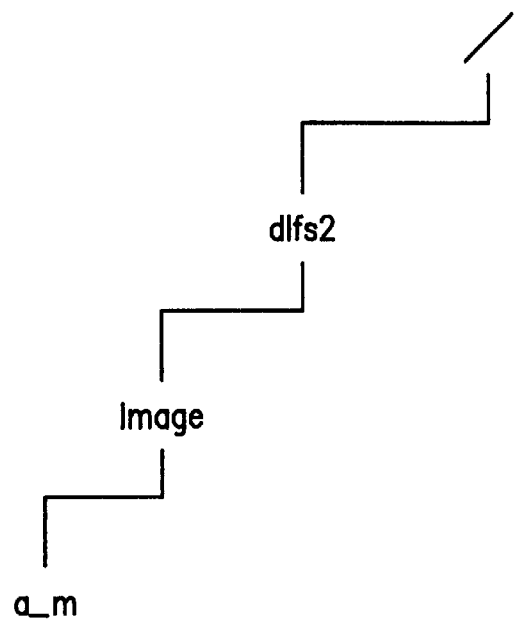
Figure 3E:
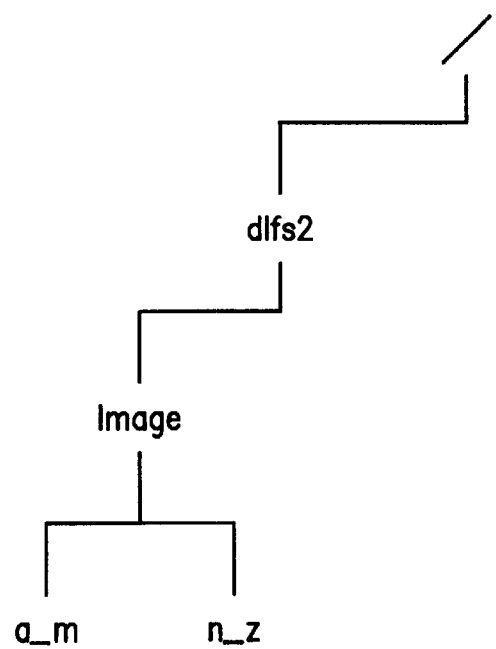
Figure 3F:
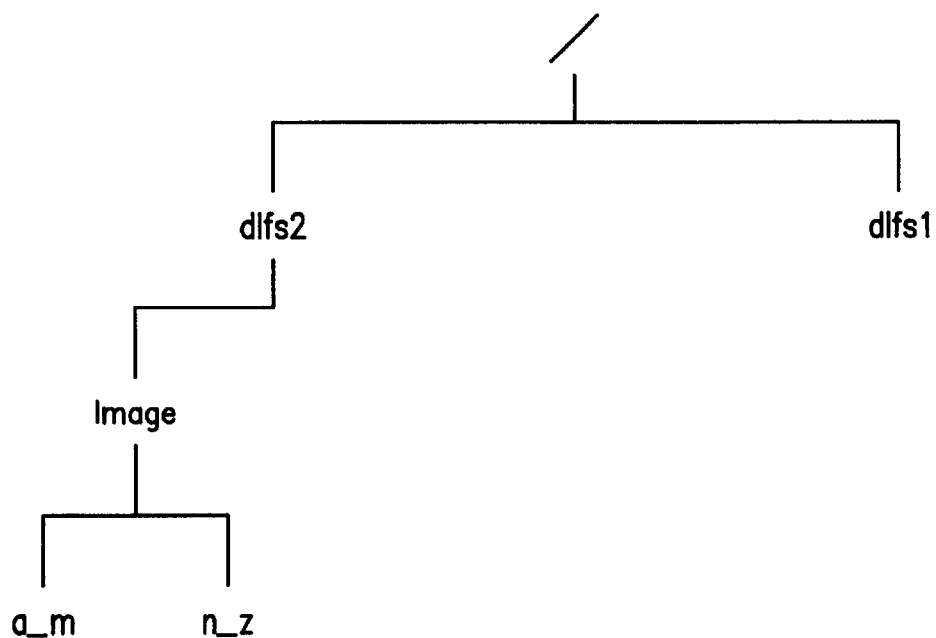
Figure 3G:
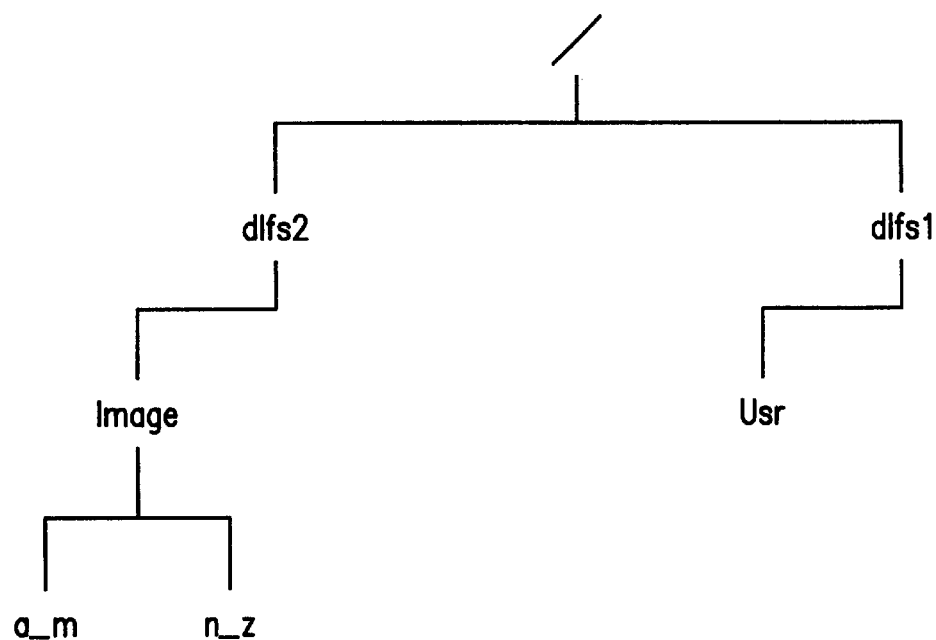

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Relational database management systems (RDBMSs) have proven to be a popular and powerful model for managing large amounts of diverse data. Recently, object-oriented capabilities have been added to traditional RDBMS systems in an effort to extend the data being managed. One area that has received a lot of attention is the integration between an RDBMS and the filesystem. An example of such efforts is the extension of IBM's® DB2® UDB® product to include DataLinks®. This technology enables an organization to continue storing data in the filesystem to take advantage of filesystem capabilities, while at the same time coordinating the management of these files and their contents with associated data in an RDBMS. These benefits are especially pronounced with particularly large files of unstructured or semi-structured data such as documents, images, video clips, and engineering drawings.

An RDBMS has become indispensable for managing traditional business data with integrity, security, and reliability but historically has not been as effective with the unstructured data identified above. These types of data (e.g. video, images, etc.) remain outside the DBMS in a filesystem, but are often related in some way to traditional data stored in the DBMS. A very simple example is that of a product's picture (a digital image file) which is related to an inventory database maintained by a manufacturer which continually needs updating with regard to pricing, inventory, part number, or design specifications.

There are many reasons to leave the unstructured data in a filesystem rather than bring it into the formal DBMS environment. In particular, RDBMSs do not know how to deliver isochronous data effectively, as in streamed video or audio. RDBMSs with their inherent overhead (e.g. parser, optimizer, etc.) have difficulty matching the performance of the filesystem in accessing files. Also, by keeping files in the filesystem, they can be located close to an application thereby optimizing performance by minimizing network traffic. Furthermore, existing applications that directly access operating systems files can continue to be used without modification.

Filesystems, however, do not provide the same comprehensive data management facilities as a DBMS, such as transaction control, enforcement of integrity constraints, and backup and recovery strategies. DataLinks® and other similar technology enables DBMSs, particularly DB2® UDB®, to manage data stored in external operating system files as if the data were stored directly in the database.

One particularly important feature of DataLinks® is that it automatically generates a backup of any external file as soon as it is linked to the database. Further, through its DataLinks® file manager, different versions of a file are tracked and backed-up to support point-in-time recovery of that file. In the event of a database crash, other database error, or data roll-back, the DBMS and DataLinks® file manager accomplishes a database recovery by using a transaction log and linked file information to synchronize files containing referenced data to the correct point of database consistency.

The present invention expands the above capabilities to handle the much more catastrophic event of a filesystem crash. In the event of a filesystem crash, the underlying operating system files and directory structures are lost and must be recovered before any attempt is made at restoring a database. Traditionally, filesystems were archived using either full or incremental strategies. Typically, each night, an entire filesystem was archived to tape or other storage media. Alternatively, each night, only those files which had been modified since the last full backup were archived to a tape. In the event of a filesystem crash, the archived tapes were then used to restore the filesystem to the state of the last backup.

In general, there are two major shortcomings to this strategy. First, any changes made to the filesystem subsequent to the time of the backup are lost; and second, restoring the filesystem to the state of an arbitrary point in time is not possible. In particular to filesystems under DBMS control, additional weaknesses become evident. The traditional backup and restore method severely limits which database backup and restore operations can be performed. In particular, only those database operations consistent with the underlying filesystem directory structure can be accomplished.

In order to support the capability of recovering from a filesystem crash, a database table is created to maintain information about the directory structure of the filesystem. The described embodiment assumes a hierarchical directory structure but other equivalent directory structure's are also capable of being tracked.

In the following discussion, the term "directory" is used to refer to both filesystem directories and subdirectories. If some differentiation is needed, terms like "parent" or "child" are used to further distinguish "directory".

In the present invention, when a directory is created, the database table receives an entry describing the new directory and when a directory is deleted from a filesystem, the corresponding entry in the table is marked "deleted" and time stamped. When a filesystem crashes, the database table is used to rebuild the filesystem directory structure. After the directory structure is rebuilt appropriate files are then restored.

The various known methods of detecting filesystem directory-modifying operations are not part of the present invention. Instruction trapping, library replacement and modification, and other functionally-equivalent, industry-standard methods to detect when a directory-modifying command is performed, are all contemplated by the present invention.

FIG. 1 illustrates an exemplary database table which tracks filesystem operations. Each entry occupies a row of the table and details an element in a filesystem directory structure. Note that the operation and recording of it is assumed to be atomic. The columns identify the information needed by a recovery process to restore a directory structure to any previous point in time.

FSID 102 is a filesystem identifier that uniquely identifies a filesystem which can be locally present or distributedly attached.

INODE 104 is an identifier internal to a particular filesystem which keeps track of the location of a directory. When a filesystem is first created under operating system control, one of the areas allocated to management information rather than data storage is an INODE list. The INODE list contains an array of INODEs which themselves contain important information about an associated file. File ownership, file access permissions and disk address are some examples of information in an INODE. Furthermore, an INODE is referred to by its INODE number—where in the INODE list it occurs. The INODE number of the root directory of a filesystem is assumed to be 0 in the current invention. However, referring to root directories using numbers other than 0 are also contemplated to be within the scope of the present invention. In each filesystem, the operating system maintains a directory information table which relates directory entries (e.g. files, directories, symbolic links) with INODE numbers.

Parent INODE 106 is the INODE number of each entry's parent directory.

Directory Name 108 is the character string for the directory represented by a particular entry.

Status 110 is a flag to keep track of whether a directory is currently active or inactive (removed).

Time Stamp 112 represents the time of the directory's creation. This value is represented as either a time or a log sequence number; either representation identifies this entry's temporal relation to other database events.

Rm_time 114 is similar to Time Stamp 112 but represents when a directory was deleted. An active directory has this field blank.

Information 116 is a field for storing metadata about a directory entry. Possible metadata information includes directory security attributes, mount information, owner, and access control list. The particular data in FIG. 1 illustrates a filesystem having the following active directories: /dlfs1/Usr/Datalinks, /dlfs2/Image/a_m, and /dlfs2/Image/n_z. Where the FSID for /dlfs1 is 12 and the FSID for /dlfs2 is 14. Directories /dlfs1/User and /dlfs2/Image/a_z have previously been deleted and are inactive.

As for the table management structures, the preferred primary key of the table illustrated in FIG. 1 is (INODE, FSID). This key selection allows for the creation of an index which allows quick scanning during any of the rebuild operations described later. Also, a self-referencing foreign key constraint is defined on (FSID, Parent INODE). This constraint ensures that the parent node of a child directory must exist before the child directory and its INODE value can be inserted as an entry in the table.

Given the database table structure identified in FIG. 1, the following algorithm is used to rebuild an entire filesystem hierarchy in the event of a filesystem or disk crash:

Complete Rebuild Algorithm

Step 1. Locate all the root-level directories by searching for all entries in the table with INODE value equal to 0 (zero). For each such located directory re-create them in the filesystem and perform steps 2 through 5. An index scan of the table's primary key is one efficient method of locating these entries.

Step 2. For each table entry located in step 1, first extract the (INODE, FSID) pair, second set the tuple (c_inode, c_fsid) equal to the extracted tuple, and third use (c_inode, c_fsid) to perform steps 3–5.

Step 3. Identify all children directories of a parent directory by finding all records that satisfy the following test:

(Parent INODE==c_inode) and
(FSID==c_fsid)

Extract the Directory Name from each identified child directory entry and create the extracted directories under the current parent directory.

Step 4. For each child directory identified in step 3, first extract its (INODE, FSID) tuple, second set the tuple (c_inode, c_fsid) equal to the extracted tuple, and third return to step 3. This step effectively sets the child directory located in the previous step 3 to the new parent directory for which children directories of the new parent directory will be searched upon returning to step 3.

Step 5. Recursively apply steps 3 and 4 until no more matching children directories are found while performing step 3.

The algorithm identified above is illustrated in the flowchart of FIG. 2: When an entire filesystem restore is started 200, the first step 202 locates a root level directory entry by searching the database table for entries having INODE values equal to 0. If no root level directory is located, then the filesystem restore is complete at step 204. When, however, a root level directory entry is located then a directory is re-created, step 206, in the filesystem for that entry. The next step, 208, extracts the FSID and INODE values from the directory entry located in step 202 and defines a current directory by setting the values c_inode and c_fsid equal to the extracted INODE and the extracted FSID values, respectively.

In step 210, the database table is searched for a child directory of the current directory by locating entries which have Parent INODE values equal to c_inode and FSID values equal to c_fsid. When a child directory entry is found, step 220 extracts the Directory Name value and then recreates the extracted directory under the current directory. At step 222, the FSID and INODE values are extracted from the directory entry located in step 220. The present current directory values are stored in step 224 for later use and a new current directory is defined in step 226 by setting c_inode and c_fsid equal to the INODE and FSID values extracted in step 222.

With these new current directory values, step 228 returns to step 210 to continue. If an entry corresponding to a child directory of the current directory is not located in step 210, then step 212 determines whether the current directory is a root level directory. If the current directory is a root level directory, then step 214 returns to step 202 which locates the next root level directory entry to process. If the current directory is not a root level directory, then step 216 changes the current directory by restoring c_fsid and c_inode to the values previously stored in step 224. With these new current directory values, step 218 returns to step 210 to continue.

Performing the above algorithm reconstructs an entire file system top down from the table by first finding the root-level directories for each filesystem and then recursively finding its children directories and its children's children directories, etc. as illustrated in the sequence of FIGS. 3a through 3g which detail the progression of the directory structure rebuilding according to the table entries in FIG. 1.

Rather than rebuilding an entire filesystem, the database table also has sufficient information to rebuild a single filesystem or a particular subdirectory of the filesystem given an (INODE, FSID) pair using the following algorithm.

Subdirectory Rebuild Algorithm

Step 1. Preferably using an index scan on the table's primary key, find the table entry with a given (INODE, FSID) pair.

Step 2. Extract the Directory Name and its Parent INODE value from the entry matched in the previous step.

Step 3. Using the Parent INODE extracted in step 2 along with the given FSID, first identify the parent directory's entry in the table and then extract its Directory Name and INODE.

Step 4. Recursively apply the above process until the parent INODE value is NULL.

Step 5. Build the full path name for the desired subdirectory by concatenating all the extracted directory names in last-found, first-out order.

Figure 4:
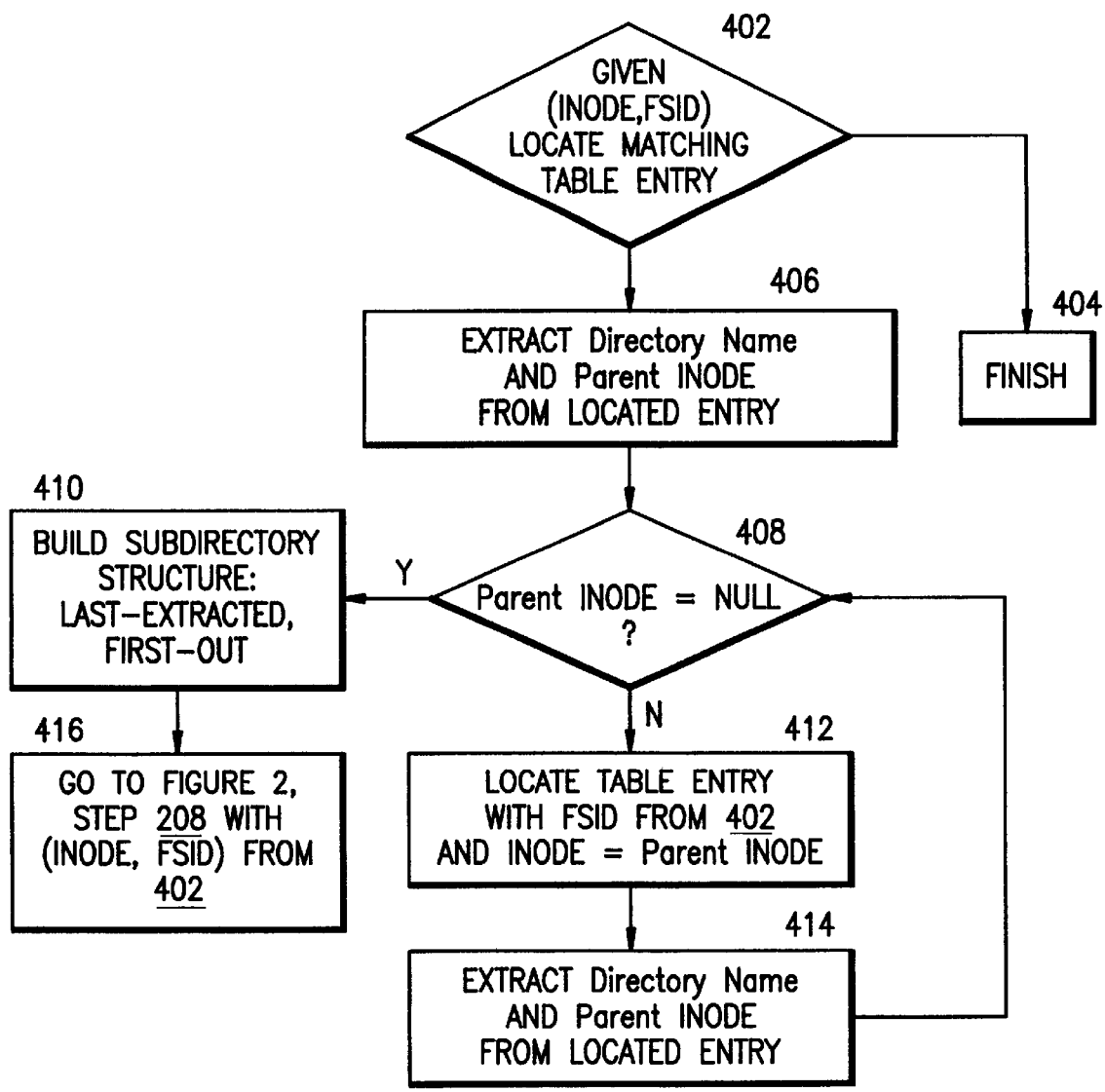
FIG. 4 illustrates a flowchart for an algorithm of the present invention which restores a single subdirectory structure.

As previously indicated, the above algorithm which is illustrated by the flowchart of FIG. 4, allows a specific subdirectory to be rebuilt using the table of filesystem directory entries discussed earlier. Given the INODE and FSID of the desired subdirectory, a matching table entry is located in step 402 and the Directory Name and Parent INODE values are extracted in step 406 from the located entry. If no matching entry is found in step 402, then the process stops in step 404.

The extracted Parent INODE value is tested in step 408. If it is not NULL, then the table is scanned in step 412 to locate the entry with an FSID value equal to the FSID value given in step 402 and an INODE value equal to the extracted Parent INODE value. Step 414 continues by extracting the directory name of the entry located in step 412 and also extracting its Parent INODE value. Step 414 completes by returning control to step 408 with the newly extracted Parent INODE value.

In step 408, if the extracted Parent INODE value is NULL (i.e. a root level directory) then upwardly traversing the subdirectory path is finished and control transfers to step 410. Step 410 rebuilds the desired subdirectory in the filesystem by re-creating the subdirectory's path according to all the extracted Directory Names in a last-found, first-out order.

Once the path from the root level to a subdirectory is reconstructed, the reconstruction of all descendants of the subdirectory is possible in step 416. By using steps 2 through 5 of The Complete Rebuild Algorithm on the (INODE, FSID) pair for a given subdirectory, a complete rebuilding of the descendants of the given subdirectory structure is accomplished.

When a filesystem crashes (disk fails), the directory structure of the file system first needs to be rebuilt. The complete rebuild algorithm is used, without any constraints, to restore a filesystem completely under DBMS control or alternatively, a more efficient method of reconstruction is also possible. Specifically, a filesystem backup is restored first from a traditional archival media to return the filesystem to the state at the time the backup was performed. Then the database table of directory entries is selectively applied to bring the filesystem to a specified state.

As an example, if a user specifies the application of all entries with a time stamp (or log sequence number) occurring after the backup was performed, then the filesystem directory structure is reconstructed back to the state right before the disk crash. Other selections of time stamp values for controlling the application of table entries allow reconstruction of the directory structure to any previous state; possible examples include a particular time of day or the last known time of a consistent or known-good database state.

Once the filesystem is rebuilt, files which occupy the filesystem must also be restored. A reconciliation agent within the DBMS is needed to accomplish this task. As discussed earlier, when a file is under DBMS control, an archive copy of the file and its changes are saved and each archived version is associated with a unique identifier and stored in a database table. In a filesystem recovery process, after the directory structure of the filesystem is reconstructed, the DBMS then performs a reconciliation process to synchronize a database state to the reconstructed filesystem directory state. The following algorithm describes a method for restoring DBMS-managed external files to a user specified database state once the directory structure of underlying filesystem is reconstructed to that same state.

Database Reconciliation Algorithm

Step 0. Restore a filesystem directory structure to a desired state using any of the above mentioned algorithms.

Step 1. A database agent receives and sets an identifier for the desired database state. Either a time stamp or log sequence number is sufficient to identify a database state.

Step 2. The database agent scans the database catalog tables to locate tables which have columns referencing external files under DBMS control.

Step 3. For each table found in step 2, the agent scans the table and extracts location information (URL) for each referenced external file.

Step 4. The agent forwards each URL and the database state identifier to a restoration process at a node identified by the URL.

Step 5. The restoration process uses the URL and database state information to search and select a file from an archived file table. Each archived file is associated with a database state identifier. If more than one file entry exists for a URL, the archived version which matches the specified database state is selected.

Step 6. The restoration process restores the file selected in step 5 to the filesystem from the archival device.

When all the tables have been processed, all files in the reconstructed directory structure that are linked to the DBMS are restored to match the requested database state. As an optimization to the above algorithm, the state of the archive table (in step 5) is first compared with the one in the filesystem, if it exists. If the states are the same then step 6 is unnecessary and is skipped.

Figure 5:
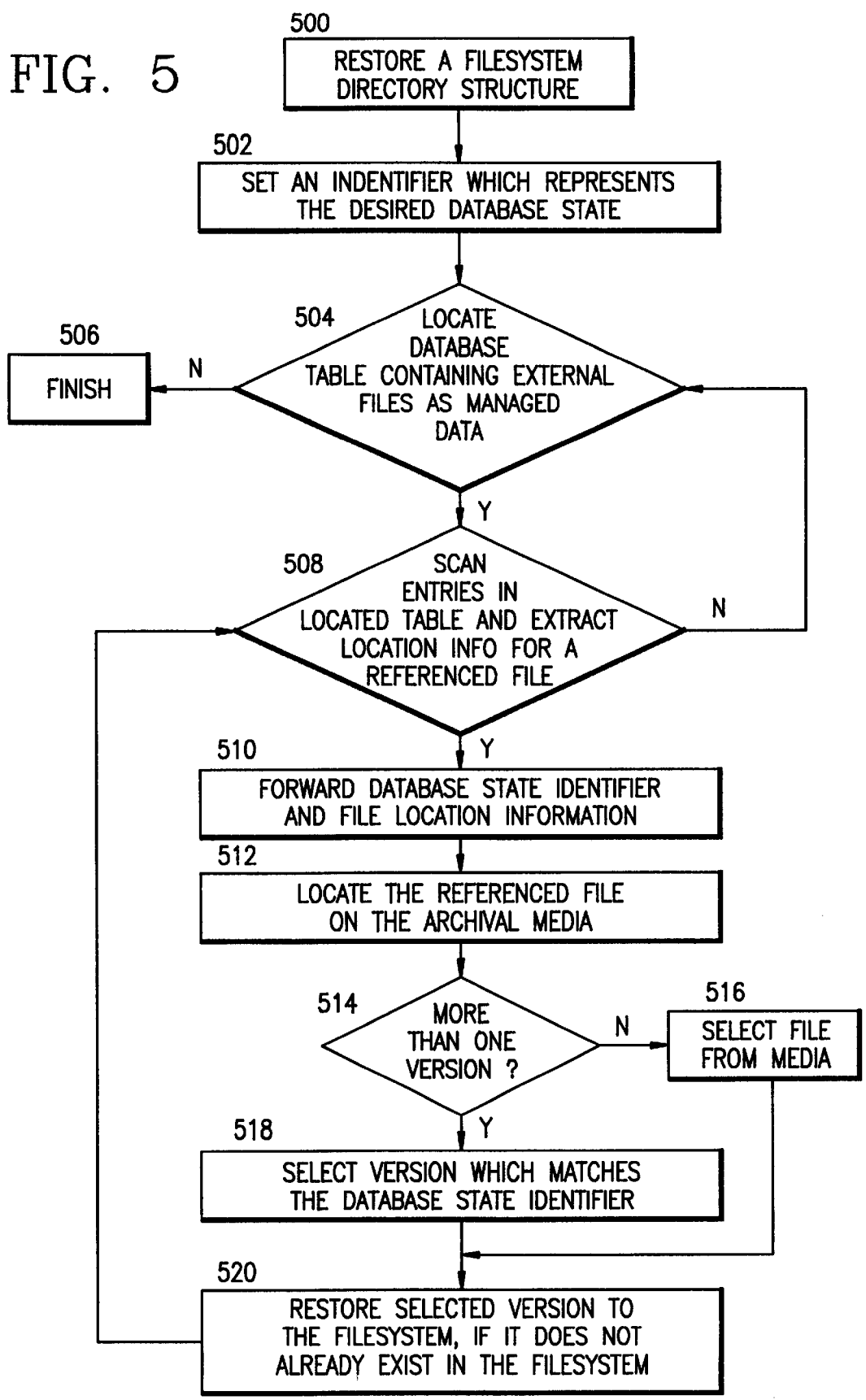
FIG. 5 illustrates a flowchart for an algorithm of the present invention which synchronizes a file recovery operation with a filesystem directory restoration.

The flowchart in FIG. 5 illustrates the above detailed algorithm for synchronizing a database file restore with a filesystem directory structure restore. First, a filesystem directory structure is restored, in step 500, to a desired state using any of the previously discussed methods. A database agent then receives this desired state information and in step 502 sets an identifier, such as a time stamp or log sequence number, which corresponds to the desired state. In step 504, the managed database catalog tables are searched to locate database tables that have columns referencing external files. If no such table is located in step 504, then all managed files have been restored and the file synchronization completes at step 506. If, however, a table is located in step 504, it is then scanned, entry by entry to extract (in step 508) file archive location information for each referenced external file.

When the scan, in step 508, for an entry in a given table fails to locate any more referenced external files in that table, control returns to step 504 in order to locate additional tables which manage external files.

Each location information extracted in step 508 is passed, along with the database state identifier, to a restoration process in step 510. The restoration process uses the location information to locate (step 512) and retrieve a referenced file from an archival media (step 516). If more than one version of the file exists, as determined by step 514, then the restoration process, in step 518, selects the version that matches the desired database state. In step 520, if the filesystem does not have the correct version of the file, the selected file version is restored from the archival media to the filesystem which was, itself, previously restored in step 500 and then returns to step 508 in order to locate the next referenced file in the current table being scanned.

As indicated, when all external file references from all managed tables have been processed and restored, step 506 is reached and the synchronization is complete.

CONCLUSION

A system and method has been shown in the above embodiments for the effective implementation of rebuilding a filesystem directory structure under database control in the event of a filesystem crash. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, database management system, database management model, directory structure, DBMS-file linking technology, the type of user interface, computer hardware platform, e-commerce platform, network operating system, archiving software, or archiving hardware. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

What is claimed is:

1. A method to restore a filesystem's directory structure to a point in time comprising the following steps:
   a. creating a database table;
   b. recording an entry in said table for each directory/subdirectory created in said filesystem, wherein each of said table entries comprises:
      a directory/subdirectory name,
      a filesystem identifier,
      a node identifier within said filesystem, and
      a parent directory's node identifier;
   c. updating an entry corresponding to a directory/subdirectory when said directory/subdirectory is modified;
   d. reconstructing said filesystem by applying at least one of said entries to restore said filesystem's directory structure to a previous state.

2. A method to restore a filesystem's directory structure to any point in time, as per claim 1, wherein each of said table entries further comprise:
   a creation time-stamp identifier.

3. A method to restore a filesystem's directory structure to any point in time, as per claim 2, wherein each of said table entries further comprises:
   a metadata information field,
   a status flag,
   a modification time-stamp identifier.

4. A method to restore a filesystem's directory structure to any point in time, as per claim 3, wherein said updating of said entry is performed upon a deletion of said directory/subdirectory.

5. A method to restore a filesystem's directory structure to any point in time, as per claim 4, wherein said updating of said entry corresponding to said deleted directory/subdirectory further comprises:
   setting said entry's status flag to inactive, and
   setting said modification time-stamp identifier to represent when said directory/subdirectory was deleted.

6. A method to restore a filesystem's directory structure to any point in time, as per claim 2, wherein said creation time-stamp identifier is one of a log sequence number or a clock value.

7. A method to restore a filesystem's directory structure to any point in time, as per claim 3, wherein said modification time-stamp identifier is one of a log sequence number or a clock value.

8. A method to restore a filesystem's directory structure to any point in time, as per claim 2, wherein each of said entries with at least a minimum creation time-stamp identifier are applied during said reconstructing of said filesystem's directory structure.

9. A method to restore a filesystem's directory structure to any point in time, as per claim 2, wherein each of said entries with a creation time-stamp identifier less than a maximum value are applied during said reconstructing of said filesystem's directory structure.

10. A method to restore a filesystem's directory structure to any point in time, as per claim 1, wherein said reconstructing said filesystem further comprises the steps:
    i. identifying at least one root-level directory entry and re-creating said directory in said filesystem;
    ii. recursively identifying all children directory entries of said root-level directory and recreating said children directories in said filesystem;
    iii. repeating step ii until all descendant directories of said root-level directory are re-created, and
    iv. repeating steps ii and iii for each of said root-level directory entries identified in step i.

11. A method to restore a filesystem's directory structure to any point in time, as per claim 2, wherein said reconstructing said filesystem further comprises the steps:
    A. identifying each of said table entries which correspond to a root-level directory in said filesystem;
    B. re-creating each of said directories identified in step A;
    C. for each of said root-level directory entries identified in step A, performing the following steps:
       i. storing said root-level directory entry's filesystem identifier in a variable, current_fsid; and storing said root-level directory entry's node identifier in a variable, current_inode;
       ii. identifying each table entry which satisfies both:
          a. said table entry's parent node identifier equals current_inode, and
          b. said table entry's filesystem identifier equals current_fsid;
       iii. re-creating a directory/subdirectory for said table entry identified in step ii;
       iv. for each of said table entries identified in step ii, storing said entry's filesystem identifier in a variable, current_fsid; and storing said entry's node identifier in a variable, current_inode, and
       v. recursively applying steps ii through iv until no matching table entries are identified in step ii.

12. A method of rebuilding a subdirectory structure in a filesystem comprising the following steps:
  a. creating a database table;
  b. recording an entry in said table for each directory/subdirectory created in said filesystem;
  c. updating an entry corresponding to a directory/subdirectory when said directory/subdirectory is modified;
  d. identifying a target subdirectory to be rebuilt;
  e. finding an entry in said database table associated with said desired subdirectory and extracting a directory/subdirectory name from said entry;
  f. identifying a parent directory of said entry found in said previously executed step (i.e step e or g);
  g. finding an entry in said database table associated with said parent directory and extracting a directory/subdirectory name from said entry;
  h. recursively applying steps f and g until a parent directory is not identified in step f, and
  i. rebuilding a full directory path by concatenating all said extracted directory/subdirectory names using a last-found first-out order.

13. A method of rebuilding a subdirectory structure in a filesystem, as per claim 12, wherein each of said entries in said table further comprises one or more of:
  a directory/subdirectory name;
  a filesystem identifier;
  a node identifier within said filesystem;
  a parent directory's node identifier;
  a creation time-stamp identifier;
  a modification time-stamp identifier;
  a status flag, and
  a metadata information field.

14. A method of rebuilding a subdirectory structure in a filesystem, as per claim 13, wherein said target subdirectory is identified by a tuple consisting of a filesystem identifier and a node identifier within said filesystem.

15. A method of rebuilding all descendant subdirectories of a target subdirectory structure rebuilt as per claim 13, comprising the following steps:
  i. storing said target subdirectory entry's filesystem identifier in a variable, current_fsid; and storing said desired subdirectory entry's node identifier in a variable, current_inode;
  ii. identifying each table entry which satisfies both:
    a. said table entry's parent node identifier equals current_inode, and
    b. said table entry's filesystem identifier equals current_fsid;
  iii. re-creating a directory/subdirectory for said table entry identified in step ii;
  iv. for each of said table entries identified in step ii, storing said entry's filesystem identifier in a variable, current_fsid; and storing said entry's node identifier in a variable, current_inode, and
  v. recursively applying steps ii through iv until no matching table entries are identified in step ii.

16. A method of restoring database managed external files to a restored filesystem's directory structure comprising the steps:
  a. identifying a desired previous database state;
  b. restoring a filesystem's directory structure to a state substantially similar to said filesystem's directory structure at said previous database state;
  c. identifying every one of said external files managed by said database;
  d. extracting at least one version of each of said identified external files and a corresponding database state identifier from an archival storage facility;
  e. if only one version of said external file is extracted, then selecting said version;
  f. if more than one version of said external file is extracted, then selecting said version which matches said desired previous database state;
  g. repeating steps d through f for each of said external files identified in step c, and
  h. restorin said selected versions of each of said identified external files to said filesystem's directory structure.

17. A method of using a database management system to maintain a record of directory operations on a filesystem which comprises the following steps:
  a. creating a managed database table;
  b. recording an entry in said table for each directory/subdirectory created in said filesystem, said entry comprising:
    a directory/subdirectory identifier;
    a status flag;
    a creation time-stamp identifier, and
    a modification time-stamp identifier;
  c. updating an entry corresponding to a directory/subdirectory when said directory/subdirectory is modified.

18. A method of using a database management system to maintain a record of filesystem directory operations, as per claim 17, wherein said directory/subdirectory identifier further comprises:
  a directory/subdirectory name;
  a filesystem identifier;
  a node identifier within said filesystem;
  a parent directory's node identifier, and
  a metadata information field.

19. A method of using a database management system to maintain a record of filesystem directory operations, as per claim 17, wherein said updating an entry further comprises:
  setting said status flag to indicate when said filesystem directory operation deletes said directory/subdirectory from said filesystem, and
  recording, as said modification time-stamp identifier, the time said filesystem directory operation deletes said directory/subdirectory from said filesystem.

20. A method of using a database management system to maintain a record of filesystem directory operations, as per claim 19, wherein said modification time-stamp identifier is one of a clock value or a log sequence number.

21. An article of manufacture comprising a computer medium having computer readable program code embodied therein which implements a restoring a filesystem's directory structure to a point in time comprising:
  a. creating a database table;
  b. recording an entry in said table for each directory/subdirectory created in said filesystem, wherein each of said table entries comprises:
    a directory/subdirectory name,
    a filesystem identifier,
    a node identifier within said filesystem, and
    a parent directory's node identifier;
  c. updating an entry corresponding to a directory/subdirectory when said directory/subdirectory is modified;

d. reconstructing said filesystem by applying at least one of said entries to restore said filesystem's directory structure to a previous state.

22. A system for restoring a filesystem's directory structure to a point in time comprising:

a filesystem comprising one or more directories;

a database management system;

a database table, managed by said database management system, comprising an entry associated with each of said directories in said filesystem;

a database agent which updates said entry when said associated directory is modified;

a restoration process which re-creates a directory in said filesystem according to said associated database table entry, and wherein at least one of said directories is re-created in order to restore said filesystem's directory structure to a previous state.

* * * * *